United States Patent
Qin

(10) Patent No.: US 12,540,958 B2
(45) Date of Patent: Feb. 3, 2026

(54) MONITORING CIRCUIT AND STORAGE SYSTEM

(71) Applicant: CHANGXIN MEMORY TECHNOLOGIES, INC., Hefei (CN)

(72) Inventor: Jianyong Qin, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 260 days.

(21) Appl. No.: 18/449,044

(22) Filed: Aug. 14, 2023

(65) Prior Publication Data

US 2024/0061026 A1 Feb. 22, 2024

Related U.S. Application Data

(63) Continuation of application No. PCT/CN2022/124145, filed on Oct. 9, 2022.

(30) Foreign Application Priority Data

Aug. 19, 2022 (CN) .......................... 202211000055.3

(51) Int. Cl.
*G01R 19/00* (2006.01)
*G01R 19/165* (2006.01)
(Continued)

(52) U.S. Cl.
CPC ..... *G01R 19/2503* (2013.01); *G01R 19/0084* (2013.01); *G01R 19/16576* (2013.01);
(Continued)

(58) Field of Classification Search
CPC .............. G01R 9/0084; G01R 9/16566; G01R 9/16576; G01R 9/25; G01R 9/2503;
(Continued)

(56) References Cited

U.S. PATENT DOCUMENTS

| 2005/0195000 A1 | 9/2005 | Parker et al. |
| 2010/0194453 A1* | 8/2010 | Kadowaki ............ H03K 17/223 327/143 |
| 2012/0102310 A1* | 4/2012 | Shim ...................... G11C 16/22 365/185.18 |

FOREIGN PATENT DOCUMENTS

| CN | 207817562 U | 9/2018 |
| CN | 108649939 A | 10/2018 |

(Continued)

OTHER PUBLICATIONS

TW first office action in application No. 112102339, mailed on Aug. 14, 2024.
(Continued)

*Primary Examiner* — Douglas X Rodriguez
*Assistant Examiner* — Kendrick X Liu
(74) *Attorney, Agent, or Firm* — Syncoda LLC; Feng Ma

(57) ABSTRACT

The embodiment the disclosure provides a monitoring circuit and a storage system. The monitoring circuit includes a voltage detection module and a logic circuit module. The voltage detection module is configured to output a first detection signal, a second detection signal and a third detection signal through a first node, a second node and a third node, respectively. The logic circuit module is configured to output a monitoring signal through a fourth node; determine whether the first detection signal has a first preset level, whether the second detection signal has a second preset level, and whether the third detection signal has a third preset level, respectively; determine the monitoring signal to be in a valid state in response to the first detection signal having the first preset level, the second detection signal having the second preset level and the third detection signal having the third preset level.

15 Claims, 6 Drawing Sheets

(51) Int. Cl.
  *G01R 19/25*     (2006.01)
  *G11C 5/14*      (2006.01)
  *G11C 16/30*     (2006.01)
  *H03K 19/003*    (2006.01)
  *H03L 5/00*      (2006.01)
(52) U.S. Cl.
  CPC ............... *G11C 5/14* (2013.01); *G11C 16/30* (2013.01); *H03K 19/00315* (2013.01); *H03L 5/00* (2013.01)
(58) Field of Classification Search
  CPC ........... G11C 16/06; G11C 16/30; G11C 5/14; H03L 5/00
  See application file for complete search history.

(56)  References Cited

FOREIGN PATENT DOCUMENTS

| | | |
|---|---|---|
| CN | 110676809 A | 1/2020 |
| JP | 2000075940 A | 3/2000 |

OTHER PUBLICATIONS

International Search Report in the international application No. PCT/CN2022/124145, mailed on Mar. 21, 2023. 3 pages.
JEDEC Standard, Low Power Double Data Rate 5(LPDDR5), JESD209-5B (Revision of JESD209-5A, Jan. 2020), Jun. 2021, JEDEC Solid State Technology Association. 622 pages.

* cited by examiner

MONITORING CIRCUIT AND STORAGE SYSTEM

CROSS-REFERENCE TO RELATED APPLICATION

The disclosure is a continuation of International Application No. PCT/CN2022/124145, filed on Oct. 9, 2022, which claims a priority to Chinese patent application No. 202211000055.3, filed on Aug. 19, 2022 and entitled "MONITORING CIRCUIT AND STORAGE SYSTEM". The entire disclosures of International Application No. PCT/CN2022/124145 and Chinese patent application No. 202211000055.3 are hereby incorporated by reference in their entireties.

TECHNICAL FIELD

Embodiments of the disclosure relates to the technical field of semiconductors, and in particular to a monitoring circuit and a storage system.

BACKGROUND

Storage systems for storing data may be divided into a volatile memory device and a non-volatile memory device. The volatile memory device such as a dynamic random access memory (DRAM) device stores data by charging or discharging of a capacitor in a memory cell and loses the stored data when the power supply is cut off. The non-volatile memory device such as a flash memory device holds the stored data even when the power supply is cut off. The volatile memory device is widely used as a main memory of various devices, and the non-volatile memory device is widely used to store program codes and/or data in various electronic devices such as a computer, a mobile device or the like.

A storage system usually operates in multiple voltage domains, and different voltage domains provide different voltages. When the voltages provided from different voltage domains meet the requirements, the storage system is in a normal power-on state, and the accuracy of a read-write operation during the period is high. When the voltages provided from different voltage domains do not meet the requirements, the storage system is in an abnormal power-on state, which will affect the normal read/write operation of the storage system. Therefore, it is very important to monitor whether the voltage from each voltage domain meets the requirement for improving a read/write performance of the storage system.

SUMMARY

Embodiments of the disclosure provide a monitoring circuit and a storage system, which are at least beneficial to monitoring whether a first voltage domain, a second voltage domain and a third voltage domain are normally powered on.

According to some embodiments of the disclosure, one aspect of the embodiments of the disclosure provides a monitoring circuit, which includes a voltage detection module and a logic circuit module. The voltage detection module is configured to: output a first detection signal, a second detection signal and a third detection signal through a first node, a second node and a third node, respectively. The voltage detection module is specifically configured to detect whether a first voltage from a first voltage domain is greater than or equal to a first preset value, and output the first detection signal having a first preset level in response to the first voltage being greater than or equal to the first preset value; detect whether a second voltage from a second voltage domain is greater than or equal to a second preset value, and output the second detection signal having a second preset level in response to the second voltage being greater than or equal to the second preset value; and detect whether a third voltage from a third voltage domain is greater than or equal to a third preset value, and output the third detection signal having a third preset level in response to the third voltage being greater than or equal to the third preset value. The logic circuit module is connected to the first node, the second node and the third node, and configured to output a monitoring signal through a fourth node. The logic circuit module is configured to: determine whether the first detection signal has the first preset level, whether the second detection signal has the second preset level, and whether the third detection signal has the third preset level, respectively; determine the monitoring signal to be in a valid state in response to the first detection signal having the first preset level, the second detection signal having the second preset level and the third detection signal having the third preset level; and determine the monitoring signal to be in an invalid state in response to at least one of the first detection signal, the second detection signal and the third detection signal not having a respective preset level.

Another aspect of the embodiments of the disclosure provides a storage system, which includes a power supply network and the monitoring circuit. The power supply network has the first voltage domain, the second voltage domain, and the third voltage domain. The monitoring circuit is provides by any of the above embodiments.

BRIEF DESCRIPTION OF THE DRAWINGS

One or more embodiments are illustrated by pictures in corresponding drawings, which do not constitute limitations on the embodiments. The element having a same reference numeral in the drawings is represented as a similar element, and the pictures in the drawings do not constitute a limitation in scale unless specifically stated. In order to more clearly explain the embodiments of the disclosure or the technical solution in the related art, the drawings used in the embodiments will be briefly described below. It will be obvious that the drawings described below are only some embodiments of the disclosure, and other drawings can be obtained from these drawings without creative effort for those of ordinary skill in the art.

DETAILED DESCRIPTION

Figure 1:
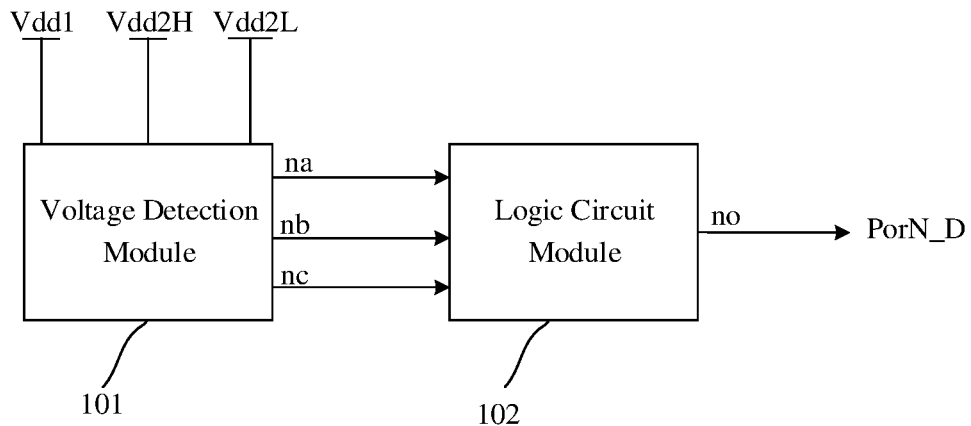
FIG. 1 is a functional block diagram illustrating a monitoring circuit according to an embodiment of the disclosure.

FIG. 1 is a functional block diagram illustrating a monitoring circuit according to an embodiment of the disclosure.

As illustrated in FIG. 1, a monitoring circuit provided by an embodiment of the disclosure includes a voltage detection module 101 and a logic circuit module 102. The voltage detection module 101 is configured to: output a first detection signal, a second detection signal and a third detection signal through a first node na, a second node nb and a third node nc, respectively; detect whether a first voltage from a first voltage domain Vdd1 is greater than or equal to a first preset value, and output the first detection signal having a first preset level in response to the first voltage being greater than or equal to the first preset value; detect whether a second voltage from a second voltage domain Vdd2H is greater than or equal to a second preset value, and output the second detection signal having a second preset level in response to the second voltage being greater than or equal to the second preset value; and detect whether a third voltage from a third voltage domain Vdd2L is greater than or equal to a third preset value, and output the third detection signal having a third preset level in response to the third voltage being greater than or equal to the third preset value. The logic circuit module 102 is connected to the first node na, the second node nb and the third node nc, and output a monitoring signal PorN_D through a fourth node no. The logic circuit module is configured to: determine whether the first detection signal has the first preset level, whether the second detection signal has the second preset level, and whether the third detection signal has the third preset level, respectively; determine the monitoring signal PorN_D to be in a valid state in response to the first detection signal having the first preset level, the second detection signal having the second preset level and the third detection signal having the third preset level; and determine the monitoring signal PorN_D to be in an invalid state in response to at least one of the first detection signal, the second detection signal and the third detection signal not having the respective preset level.

The monitoring circuit may be applied in a storage system to monitor whether the first voltage domain Vdd1, the second voltage domain Vdd2H, and the third voltage domain Vdd2L supplying power to a memory array of the storage system meet a power supply requirement of the memory array. In the embodiment of the disclosure, whether the first voltage, the second voltage and the third voltage respectively provided by the first voltage domain Vdd1, the second voltage domain Vdd2H and the third voltage domain Vdd2L meet the requirement can be determined by determining whether the monitoring signal PorN_D is in a valid state. The first detection signal is used to indicate whether the first voltage provided from the first voltage domain Vdd1 meets a requirement. If the first voltage is greater than or equal to the first preset value, the first detection signal meets the requirement. The second detection signal is used to indicate whether the second voltage provided from the second voltage domain Vdd2H meets a requirement. If the second voltage is greater than or equal to the second preset value, the second detection signal meets the requirement. The third detection signal is used to indicate whether the third voltage provided by the third voltage domain Vdd2L meets a requirement. If the third voltage is greater than or equal to the third preset value, the third detection signal meets the requirement. Under the condition that the first detection signal, the second detection signal and the third detection signal all meet the requirements, a monitoring signal PorN_D in a valid state is generated. Therefore, in the embodiment of the disclosure, whether all the voltages provided by the first voltage domain Vdd1, the second voltage domain Vdd2H and the third voltage domain Vdd2L meet the requirements may be obtained by determining whether the monitoring signal PorN_D is in a valid state or an invalid state, so that the first voltage domain Vdd1, the second voltage domain Vdd2H and the third voltage domain Vdd2L that meet the requirements can be used to supply power to the memory array in the storage system, thereby ensuring a correct read/write operation of the memory array.

It can be understood that a magnitude relationship among the first preset value, the second preset value, and the third preset value can be reasonably set according to an actual requirements for the first voltage domain Vdd1, the second voltage domain Vdd2H, and the third voltage domain Vdd2L. The details are as follows.

In an example, Vdd1>Vdd2H>Vdd2L is a normal power-on state (i.e. the first voltage domain, the second voltage domain and the third voltage domain all meet the requirements). Vdd2H>Vdd1 is an abnormal power-on state (i.e. the first voltage domain and the second voltage domain do not meet the requirements). Vdd2L>Vdd2H is an abnormal power-on state (i.e. the second voltage domain and the third voltage domain do not meet the requirement). Correspondingly, the first preset value is greater than the second preset value which is greater than the third preset value.

In another example, Vdd2H>Vdd2L>Vdd1 is a normal power-on state. Vdd2L>Vdd2H is an abnormal power-on state. Vdd1>Vdd2H is an abnormal power-on state. Correspondingly, the second preset value is greater than the third preset value which is greater than the first preset value.

In yet another example, Vdd2H>Vdd1>Vdd2L is a normal power-on state (i.e. the first voltage domain, the second voltage domain and the third voltage domain all meet the requirements). Vdd2L>Vdd2H is an abnormal power-on state. Vdd1>Vdd2H is an abnormal power-on state. Correspondingly, the second preset value is greater than the first preset value which is greater than the third preset value.

It can be understood that Vdd1 actually refers to a voltage value of the first voltage, Vdd2H actually refers to a voltage value of the second voltage, and Vdd2L actually refers to a voltage value of the third voltage in the above relationship. In some embodiments, Vdd1>Vdd2H>Vdd2L is a common power requirement for a fifth-generation Low Power Double Data Rate (LPDDR5) DRAM storage system.

Figure 2:
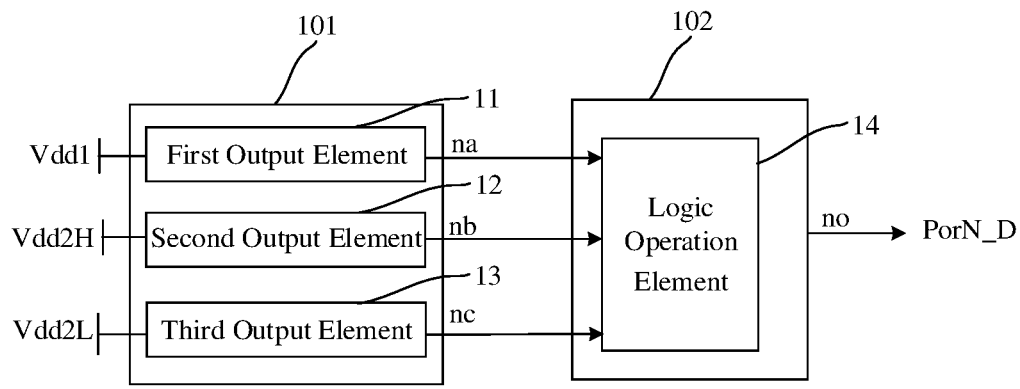
FIG. 2 is another functional block diagram illustrating a monitoring circuit according to an embodiment of the disclosure.

FIG. 2 is another functional block diagram illustrating a monitoring circuit according to an embodiment of the disclosure. As illustrated in FIG. 2, in some embodiments, the voltage detection module 101 includes a first output element 11, a second output element 12, and a third output element 13. The first output element 11 is configured to directly output the first detection signal to the logic circuit module 102. The second output element 12 is configured to directly output the second detection signal to the logic circuit module 102. The third output element 13 is configured to directly output the third detection signal to the logic circuit module 102. The first output element 11, the second output element 12 and the third output element 13 all operate in the second voltage domain Vdd2H. The logic circuit module 102 includes a logic operation element 14 directly connected to the first node na, the second node nb and the third node nc, and the logic operation element 14 operates in the second voltage domain Vdd2H. The first preset value is greater than the second preset value which is greater than the third preset value.

An output end of the first output element 11 is the first node na, an output end of the second output element 12 is the second node nb, and an output end of the third output element 13 is the third node nc. The logic operation element 14 is directly connected to the first output element 11, the second output element 12, and the third output element 13, all of the four element operate in the second voltage domain Vdd2H. It should be noted that the first output element 11, the second output element 12 and the third output element 13 are all directly connected to the respective voltage domains in the FIG. 2, which does not represent that the output element directly outputs the input voltage of the respective voltage domain. There are other detection units between the output element and the respective voltage domain (or input voltages) to be detected, or the output element belongs to a part of the respective detection unit, which is not illustrated herein.

Figure 3:
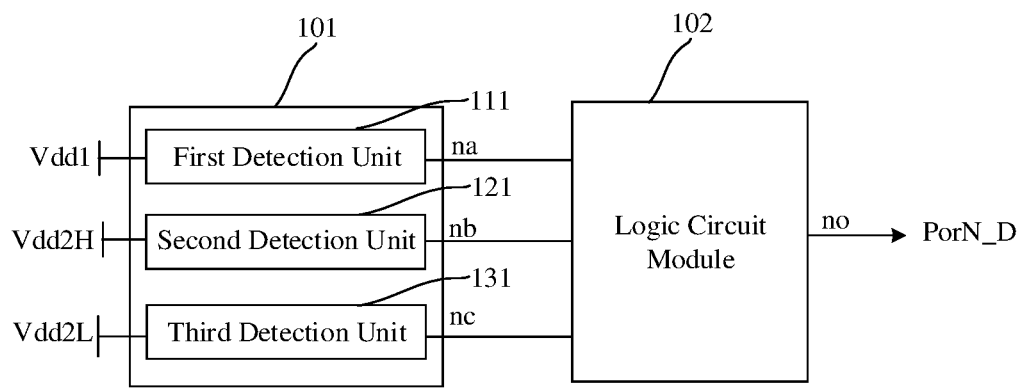
FIG. 3 is yet another functional block diagram illustrating a monitoring circuit according to an embodiment of the disclosure.

FIG. 3 is yet another functional block diagram illustrating a monitoring circuit according to an embodiment of the disclosure. As illustrated in FIG. 3, in some embodiments, the voltage detection module 101 includes a first detection unit 111, a second detection unit 121 and a third detection unit 131. An output end of the first detection unit 111 is the first node na and the first detection unit 111 is configured to detect whether the first voltage is greater than or equal to the first preset value. An output end of the second detection unit 121 is the second node nb and the second detection unit 121 is configured to detect whether the second voltage is greater than or equal to the second preset value. An output end of the third detection unit 131 is the third node nc and the third detection unit 131 is configured to detect whether the third voltage is greater than or equal to the third preset value.

If the first voltage is greater than or equal to the first preset value, the first detection unit 111 outputs a first detection signal having a first preset level and defines that the first detection signal having the first preset level is valid. If the first voltage is smaller than the first preset value, the first detection unit 111 outputs an invalid first detection signal, that is, the level of the first detection signal is not the first preset level. The first detection unit 111 may have a first output element with an output end as the first node. That is, the first detection unit 111 includes the first output element directly connected to the logic circuit module 102, and the first output element operates in the second voltage domain Vdd2H.

If the second voltage is greater than or equal to the second preset value, the second detection unit 121 outputs a second detection signal having a second preset level and defines that the second detection signal having the second preset level is valid. If the second voltage is smaller than the second preset value, the second detection unit 121 outputs an invalid second detection signal. That is, the level of the second detection signal is not the second preset level. The second detection unit 121 may have a second output element with an output end as the second node. That is, the second detection unit 121 includes a second output element directly connected to the logic circuit module 102, and the second output element operates in the second voltage domain Vdd2H.

If the third voltage is greater than or equal to the third preset value, the third detection unit 131 outputs a third detection signal having a third preset level and defines that the third detection signal having the third preset level is valid. If the third voltage is smaller than the third preset value, the third detection unit 131 outputs an invalid third detection signal. That is, the level of the third detection signal is not the third preset level. The third detection unit 131 may have a third output element with an output end as the third node. That is, the third detection unit 131 includes a third output element directly connected to the logic circuit module 102, and the third output element operates in the second voltage domain Vdd2H.

In some embodiments, the first preset level, the second preset level, and the third preset level may all be low levels, that is, the valid first detection signal, the valid second detection signal, and the valid third detection signal are all low level signals, which are logic "0". In other embodiments, the first preset level, the second preset level, and the third preset level may also all be high levels, that is, the valid first detection signal, the valid second detection signal, and the valid third detection signal are all high level signals, which are logic "1". It can be understood that the first preset level, the second preset level and the third preset level may all low levels or all high levels according to the actual circuit design of the first detection unit, the second detection unit and the third detection unit.

Figure 4:
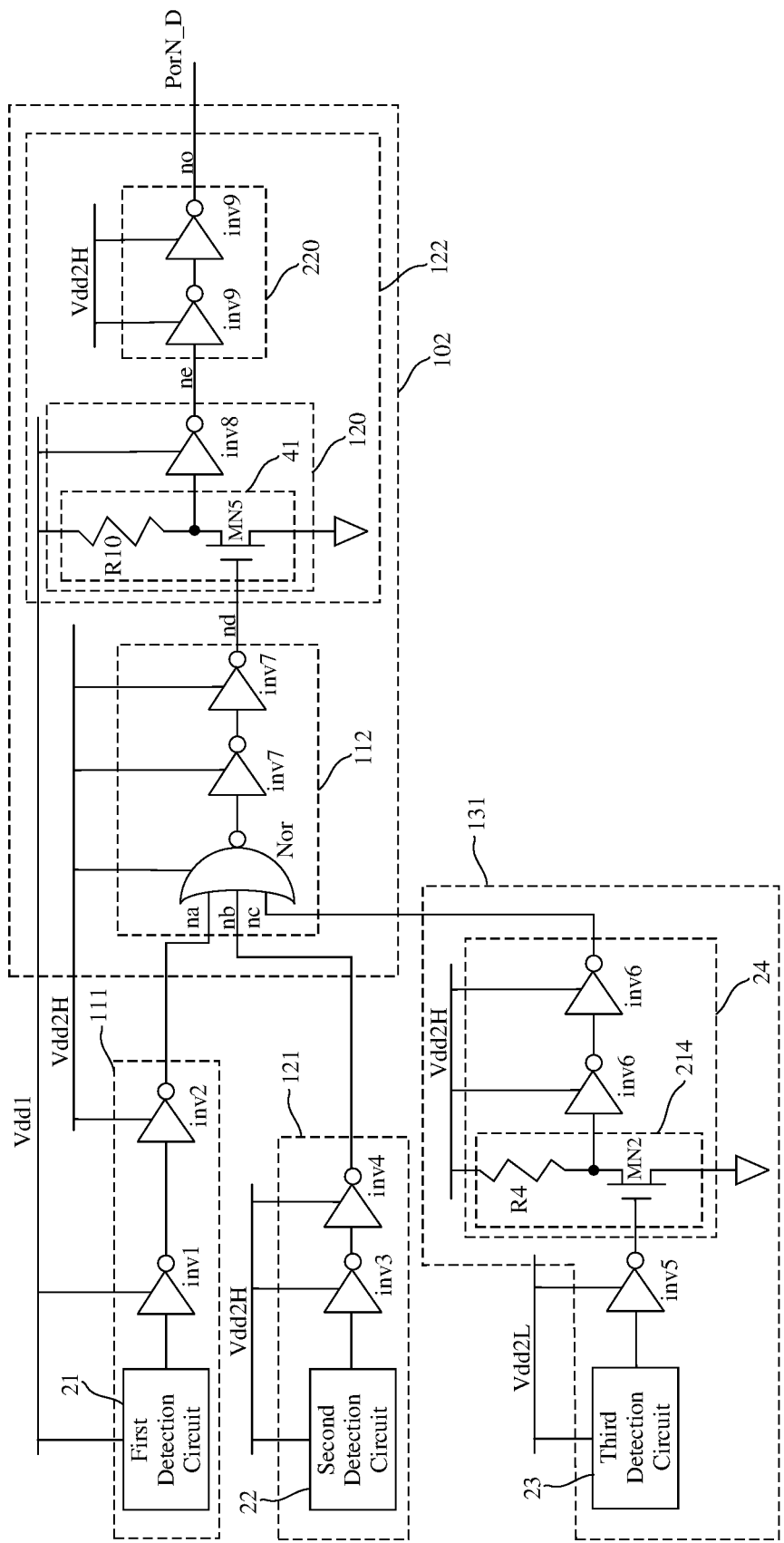
FIG. 4 is a schematic diagram illustrating a circuit structure of a monitoring circuit according to an embodiment of the disclosure.

FIG. 4 is a schematic diagram illustrating a circuit structure of a monitoring circuit according to an embodiment of the disclosure. As illustrated in FIG. 4, in some embodiments, the first detection unit 111 may include a first detection circuit 21, a first inverter inv1 and a second inverter inv2. The first detection circuit 21 is configured to detect whether the first voltage is greater than or equal to the first preset value, and output the first detection signal having the first preset level through an output end of the first detection circuit in response to the first voltage being greater than or equal to the first preset value. The first inverter inv1 operates in the first voltage domain and has an input end connected to the output end of the first detection circuit. The second inverter inv2 operates in the second voltage domain, and has an input end connected to an output end of the first inverter inv1 and an output end as the first node na.

It can be understood that the second inverter inv2 is the first output element.

Figure 5:
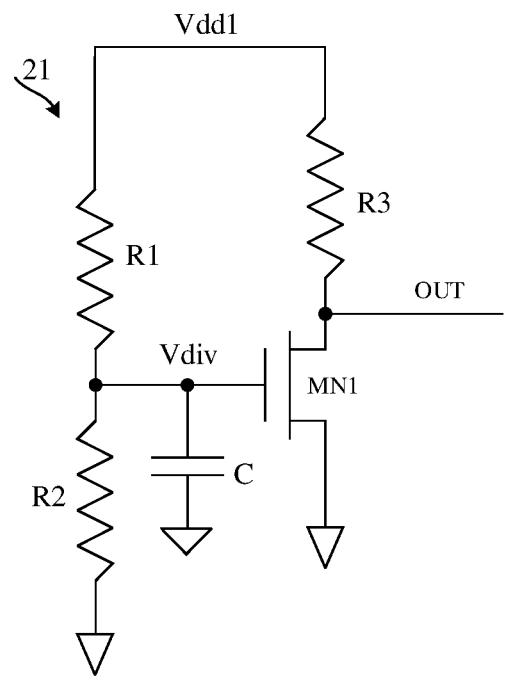
FIG. 5 is a schematic diagram illustrating a circuit structure of a first detection circuit in the monitoring circuit according to an embodiment of the disclosure.

FIG. 5 is a schematic diagram illustrating a circuit structure of a first detection circuit in the monitoring circuit according to an embodiment of the disclosure. As illustrated in FIG. 5, the first detection circuit 21 includes a first resistor R1 and a second resistor R2 connected in series, a third resistor R3 and a first Negative channel Metal Oxide Semiconductor (NMOS) transistor MN1. One end of the first resistor R1 receives the first voltage, the other end of the first resistor R1 and one end of the second resistor R2 are connected to a first voltage dividing node Vdiv, and the other end of the second resistor R2 is grounded. The third resistor R3 has one end for receiving the first voltage. That is, one end of the third resistor R3 operates in the first voltage domain Vdd1. The first NMOS transistor MN1 has a gate connected to the first voltage dividing node Vdiv, a drain connected to the other end of the third resistor R3 and used as the output of the first detection circuit 21, and a source grounded.

Figure 6:
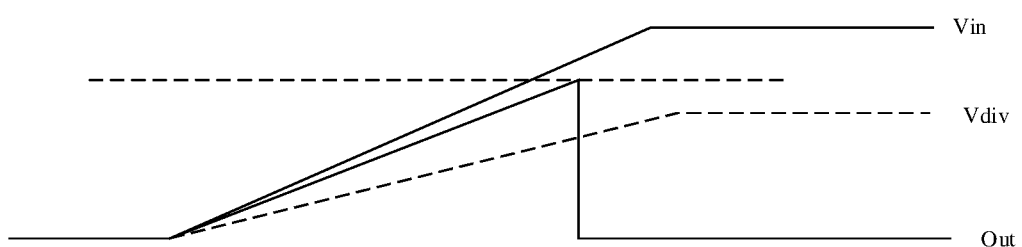
FIG. 6 is schematic diagram illustrating signal waveforms of a first voltage, an output of a first voltage dividing node, and an output of the first detection circuit in FIG. 5.

FIG. 6 is schematic diagram illustrating signal waveforms of a first voltage, an output of a first voltage dividing node, and an output of the first detection circuit in FIG. 5. As illustrated in FIG. 5 and FIG. 6, the first preset level is a low level, and the operation principle of the first detection circuit 21 is as follows.

The first resistor R1 and the second resistor R2 is used as voltage dividers and adjust the voltage of the first voltage dividing node Vdiv. Specifically, the first voltage is Vin, before the first NMOS transistor MN1 is turned on, the voltage at the first voltage dividing node Vdiv is R2×Vin/(R1+R2), and the output end of the first detection circuit 21 is pulled up by the third resistor R3 to be equivalent to the first voltage Vin. When the first voltage Vin is gradually increased, the voltage of the first voltage dividing node Vdiv is increased accordingly. When the first voltage dividing node Vdiv is increased to the first target voltage, the gate of the first NMOS transistor MN1 is controlled based on a first target voltage, so that the first NMOS transistor MN1 is turned on, and the voltage of the output end of the first detection circuit 21 (i.e. the source of the first NMOS transistor MN1) is rapidly pulled down, so that the output end of the first detection circuit 21 outputs a low level signal. That is, the output end of the first detection circuit 21 outputs a first detection signal having a first preset level.

As illustrated in FIG. 5, the first detection circuit 21 may further includes a first capacitor C, one end of the first capacitor C is connected to the first voltage dividing node Vdiv, and the other end of the first capacitor C is grounded. The first capacitor C can denoise the first voltage dividing node Vdiv.

It can be understood that any of the first resistor R1, the second resistor R2, and the third resistor R3 may be composed of a single resistor, multiple resistors in series, or multiple resistors in parallel.

As can be seen from the above analysis, the resistance values of the first resistor R1 and the second resistor R2 can be reasonably selected according to an actual circuit requirement, that is, according to the first preset value. That is, the value of R2/(R1+R2) can be reasonably selected to ensure that the first NMOS transistor MN1 is turned on when the first voltage is greater than or equal to the first preset value.

As illustrated in FIG. 4, in some embodiments, the second detection unit 121 may include a second detection circuit 22, a third inverter inv3, and a fourth inverter inv4. The second detection circuit 22 is configured to detect whether the second voltage is greater than or equal to the second preset value, and output the second detection signal having the second preset level through an output end of the second detection circuit in response to the second voltage being greater than or equal to the second preset value. The third inverter inv3 operates in the second voltage domain Vdd2H, and has an input end connected to the output end of the second detection circuit 22. The fourth inverter inv4 operates in the second voltage domain Vdd2H, and has an input end connected to an output end of the third inverter inv3 and an output end as the second node nb.

It can be understood that the fourth inverter inv4 is the second output element.

The second detection circuit 22 may include a fifth resistor and a sixth resistor connected in series, a seventh resistor and a third NMOS transistor. One end of the fifth resistor receives the second voltage, the other end of the fifth resistor and one end of the sixth resistor are connected to a second voltage dividing node, and the other end of the sixth resistor is grounded. The seventh resistor has one end for receiving the second voltage. The third NMOS transistor has a gate connected to the second voltage dividing node, a drain connected to the other end of the seventh resistor and used as the output of the second detection circuit 22, and a source grounded.

The second detection circuit 22 may further include a second capacitor, one end of the second capacitor is connected to the second voltage dividing node, and the other end of the second capacitor is grounded.

The second preset level is a low level, and the specific implementation of the second detection circuit 22 can be referred to the above-mentioned detailed description of the first detection circuit 21 and will not be repeated herein.

The gate of the third NMOS transistor receives the second target voltage to be turned on. The resistance values of the fifth resistor and the sixth resistor can be reasonably selected according to the second preset value, to ensure that the third NMOS transistor is turned on when the second voltage is greater than or equal to the second preset value. In some embodiments, the first preset value is greater than the second preset value, if a channel aspect ratio of the first NMOS transistor and a channel aspect ratio of the third NMOS transistor are the same and the first target voltage is equal to the second target voltage, the value of R2/(R1+R2) should be less than the value of R6/(R5+R6), where R5 is a resistance value of the fifth resistor and R6 is a resistance value of the sixth resistor.

As illustrated in FIG. 4, in some embodiments, the third detection unit 131 may include a third detection circuit 23, a fifth inverter inv5 and a third output element 24. The third detection circuit 23 is configured to detect whether the third voltage is greater than or equal to the third preset value, and output the third detection signal having the third preset level through an output end of third detection circuit 23 in response to the third voltage being greater than or equal to the third preset value. The fifth inverter inv5 operates in the third voltage domain Vdd2L, and has an input end connected to the output end of the third detection circuit 23. The third output element 24 operates in the second voltage domain Vdd2H, and has an input end connected to an output end of the fifth inverter inv5 and an output end as the third node nc.

The third detection circuit 23 may include a seventh resistor and an eighth resistor connected in series, a ninth resistor and a fourth NMOS transistor. One end of the seventh resistor receives the third voltage, the other end of the seventh resistor and one end of the eighth resistor are connected to a third voltage dividing node, and the other end of the eighth resistor is grounded. The ninth resistor has one end for receiving the third voltage. The fourth NMOS transistor has a gate connected to the third voltage dividing node, a drain is connected to the other end of the ninth resistor and used as the output of the third detection circuit 23, and a source of the fourth NMOS transistor is grounded.

The third detection circuit may further include a third capacitor, one end of the third capacitor is connected to a third voltage dividing node, and the other end of the third capacitor is grounded.

The third preset level is a low level, and the specific implementation of the third detection circuit 23 can be referred to the above-mentioned detailed description of the first detection circuit 21 and will not be repeated herein.

The gate of the fourth NMOS transistor receives the third target voltage to be turned on. The resistance values of the seventh resistor and the eighth resistor can be reasonably selected according to the third preset value, to ensure that the fourth NMOS transistor is turned on when the third voltage is greater than or equal to the third preset value. In some embodiments, the second preset value is greater than the third preset value, if a channel aspect ratio of the third NMOS transistor and a channel aspect of the fourth NMOS transistor are the same and the first target voltage is equal to the third target voltage, the value of R2/(R1+R2) should be less than the value of R8/(R7+R8), where R7 is a resistance value of the seventh resistor and R8 is a resistance value of the eighth resistor.

As illustrated in FIG. 4, in some embodiments, the third output element 24 may include a first level conversion unit 214 and an even number of cascaded sixth inverters inv6. The first level conversion unit 214 operates in the second voltage domain Vdd2H and connected to the output end of the fifth inverter inv5, and outputs the third detection signal. The even number of cascaded sixth inverters inv6 operate in the second voltage domain Vdd2H, and have an input end in a first stage for receiving the third detection signal and an output end in a last stage as the third node nc.

In some examples, when it is detected that the third voltage is greater than or equal to a third preset value, the output end of the third detection circuit 23 outputs a third detection signal having a third preset level. The third preset level is a low level, and the output end of the fifth inverter inv5 outputs a high level. The first level conversion unit 214 is connected to the output end of the fifth inverter inv5, and reverses the high level to re-output a third detection signal having a third preset level. An even number of cascaded sixth inverters inv6 are beneficial for improving a transmission capability of the third detection signal to continue transmission. If the third voltage is less than the third preset value, the third detection signal output by the third detection circuit 23 is invalid, that is, the third detection signal is a high level signal, and the output end of the fifth inverter inv5 outputs a low level. The first level conversion unit 214 reverses the low level, to output a high level signal, that is, the first level conversion unit 214 outputs an invalid third detection signal.

In other embodiments, the third preset level may be a high level, and the operating principle of the first level conversion unit 214, the fifth inverter inv5 and the sixth inverter inv6 will not be repeated herein.

As illustrated in FIG. 4, the first level conversion unit 214 may include a fourth resistor R4 and a second NMOS transistor MN2. One end of the fourth resistor R4 is used for receiving the second voltage, the other end of the fourth resistor R4 is connected to a drain of the second NMOS transistor MN2 and is an output node for outputting the third detection signal, an source of the second NMOS transistor MN2 is grounded and a gate of the second NMOS transistor MN2 is connected to the output end of the fifth inverter inv5.

One end of the fourth resistor R4 operates in the second voltage domain Vdd2H.

As illustrated in FIG. 4, the logic circuit module 102 includes a nor circuit 112 and a drive circuit 122. The nor circuit 112 is connected to the first node na, the second node nb and the third node nc, and operates in the second voltage domain Vdd2H, and configured to output the monitoring signal ProN_D through a fifth node nd. The first preset level, the second preset level and the third preset level are a same level. The drive circuit 122 is configured to provide a transmission path for transmitting the monitoring signal ProN_D from the fifth node nd to the fourth node no.

The fifth node nd is an output of the nor circuit 112. The first preset level, the second preset level and the third preset level are the same level, that is, the first detection signal having the first preset level, the second detection signal having the second preset level and the third detection signal having the third preset level are all logic "1" or all logic "0".

In some examples, the first preset level, the second preset level, and the third preset level are all a low level, that is, the first detection signal having the first preset level, the second detection signal having the second preset level, and the third detection signal having the third preset level are all logic "0". Correspondingly, the monitoring signal PorN_D in the valid state is a high level signal that is logic "1", and the monitoring signal PorN_D in the invalid state is a low level signal that is logic "0".

In other examples, the first preset level, the second preset level, and the third preset level may all be a high level, that is, the first detection signal having the first preset level, the second detection signal having the second preset level, and the third detection signal having the third preset level are all logic "1". Correspondingly, the monitoring signal PorN_D in the valid state is a low level signal that is logic "0", and the monitoring signal PorN_D in the invalid state is a high level signal that is logic "1".

As illustrated in FIG. 4, in some embodiments, the nor circuit 112 may include a nor gate Nor, an even number of cascaded seventh inverters inv7. The nor gate Nor operates in the second voltage domain Vdd2H. Three input ends of the nor gate Nor are connected to the first node na, the second node nb and the third node nc respectively. All the even number of cascaded seventh inverters inv7 operate in the second voltage domain Vdd2H, and the input end of the seventh inverter inv7 in the first stage is connected to an output end of the nor gate Nor, and the output end of the seventh inverter inv7 in the last stage is the fifth node nd. The nor gate Nor is a logic operation element directly connected to the first node na, the second node nb and the third node nc.

An even number of cascaded seventh inverters inv7 can improve the transmission capability of the monitoring signal PorN_D.

In general, the specific circuit position where the monitoring signal PorN_D is actually used is usually relatively far away from the fifth node nd of the nor circuit 112, and the fourth node no can be directly connected to the output end of the specific circuit where the monitoring signal PorN_D is actually used. The drive circuit 122 can improve the transmission capability of the monitoring signal PorN_D from the fifth node nd to the fourth node no, which is beneficial to improving the transmission speed and transmission accuracy of the monitoring signal PorN_D.

The drive circuit 122 may include a first drive circuit 120 and a second drive circuit 220. The first drive circuit 120 operates in the first voltage domain Vdd1, and is configured to provide a first transmission path for transmitting the monitoring signal PorN_D from the fifth node nd to a sixth node ne. The sixth node ne is located between the fourth node no and the fifth node nd. The second drive circuit 220 operates in the second voltage domain Vdd2H, and provides a second transmission path for transmitting the monitoring signal PorN_D from the sixth node ne to the fourth node no.

The first drive circuit 120 is farther from the fourth node no than the second drive circuit 220. As a result, the first drive circuit 120 operates in a first voltage domain Vdd1 having a relatively large voltage, and the second drive circuit 220 operates in a second voltage domain Vdd2H having a relatively small voltage. In other embodiments, it will be understood that the first drive circuit 120 and the second drive circuit 220 may both operate in the first voltage domain Vdd1 or in the second voltage domain Vdd2H.

The first drive circuit 120 includes a second level conversion unit 41 and an eighth inverter inv8. The second level conversion unit 41 is connected to the fifth node nd, operates the first voltage domain Vdd1, and configured to receive the monitoring signal PorN_D, and output an inversed monitoring signal. A phase of the inversed monitoring signal is opposite to a phase of the monitoring signal PorN_D. The eighth inverter inv8 operates in the first voltage domain Vdd1 and has an input end for receiving the inverted monitoring signal and an output end as the sixth node ne.

In some examples, the monitoring signal PorN_D is in a valid state, and the monitoring signal PorN_D in the valid state is a high level signal. Correspondingly, the output end (i.e. the fifth node nd) of the seventh inverter inv7 at the end stage (i.e. the last stage) outputs a high level. The second level conversion unit 41 is connected to the output end of the seventh inverter inv7 at the last stage, and reverses the high level to output a low level signal. The low level signal is transmitted to the eighth inverter inv8, and the output end of the eighth inverter inv8 (i.e. the sixth node ne) outputs a high level signal, which is the monitoring signal PorN_D having a high level, that is, the monitoring signal PorN_D in an valid state. If the monitoring signal PorN_D is in an invalid state and the monitoring signal PorN_D in the invalid state is a low level signal, the output end of the seventh inverter inv7 in the last stage outputs a low level signal. The second level conversion unit 41 reverses the low level to output a high level signal. The high-level signal is transmitted to the eighth inverter inv8, and the output end of the eighth inverter inv8 outputs a low level signal, which is an invalid monitoring signal PorN_D.

In other examples, the monitoring signal PorN_D is in the valid state, and the monitoring signal PorN_D in the valid state may also be a low level signal, and the monitoring signal PorN_D in the invalid state may also be a high level signal. The operating principles of the seventh inverter inv7, the second level conversion unit 41 and the eighth inverter inv8 will not be repeated.

The second level conversion unit 41 may include a tenth resistor R10 and a fifth NMOS transistor MN5. One end of the tenth resistor R10 is used for receiving a first voltage, and the other end of the tenth resistor R10 is connected to a drain of the fifth NMOS transistor MN5 and is used as an output end of the second level conversion unit 41, an source of the fifth NMOS transistor MN5 is grounded, and a gate of the fifth NMOS transistor MN5 is connected to a fifth node nd.

That is, one end of the tenth resistor R10 operates in the first voltage domain Vdd1.

As illustrated in FIG. 4, in some embodiments, the second drive circuit 220 may include an even number of cascaded ninth inverters inv9. The even number of cascaded ninth inverters inv9 operates in the second voltage domain Vdd2H, and have an input end in a first stage connected to the sixth node ne and an output end in a last stage as the fourth node no.

It will be understood that the "even number" mentioned in embodiments of the disclosure may be any even number, such as 2, 4, 6, 8, 10, 14 and the like, and the "odd number" may be any odd number, such as 1, 3, 5, 7, 9 and the like.

Figure 7:
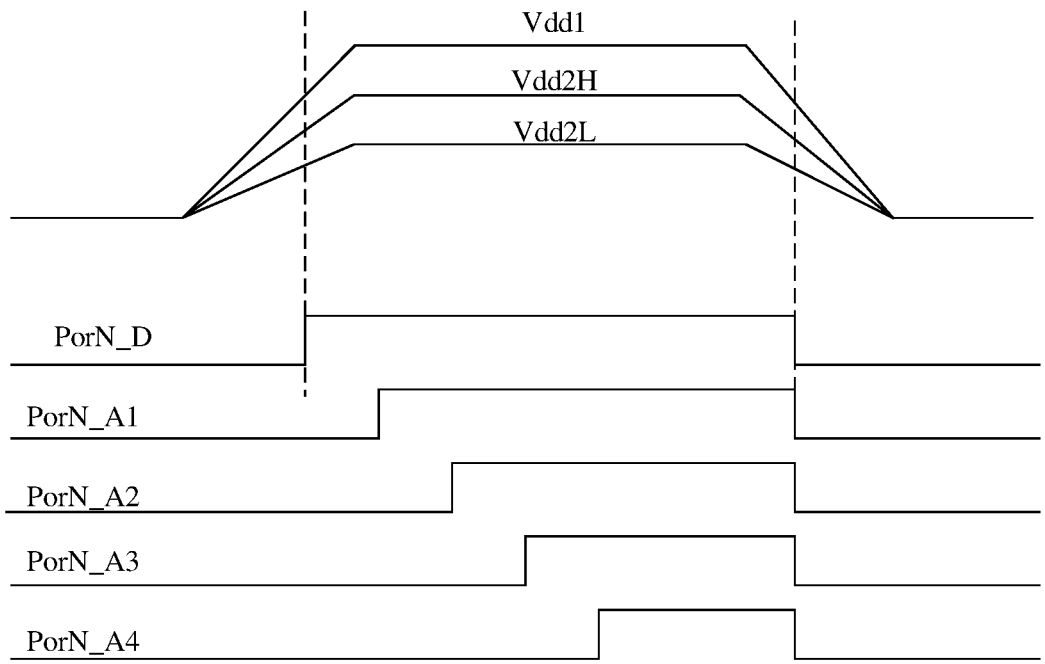
FIG. 7 to FIG. 9 are three different schematic diagrams all illustrating voltage waveforms of a first voltage domain, a second voltage domain, a third voltage domain and a monitoring signal in the embodiments of the disclosure.
Figure 8:
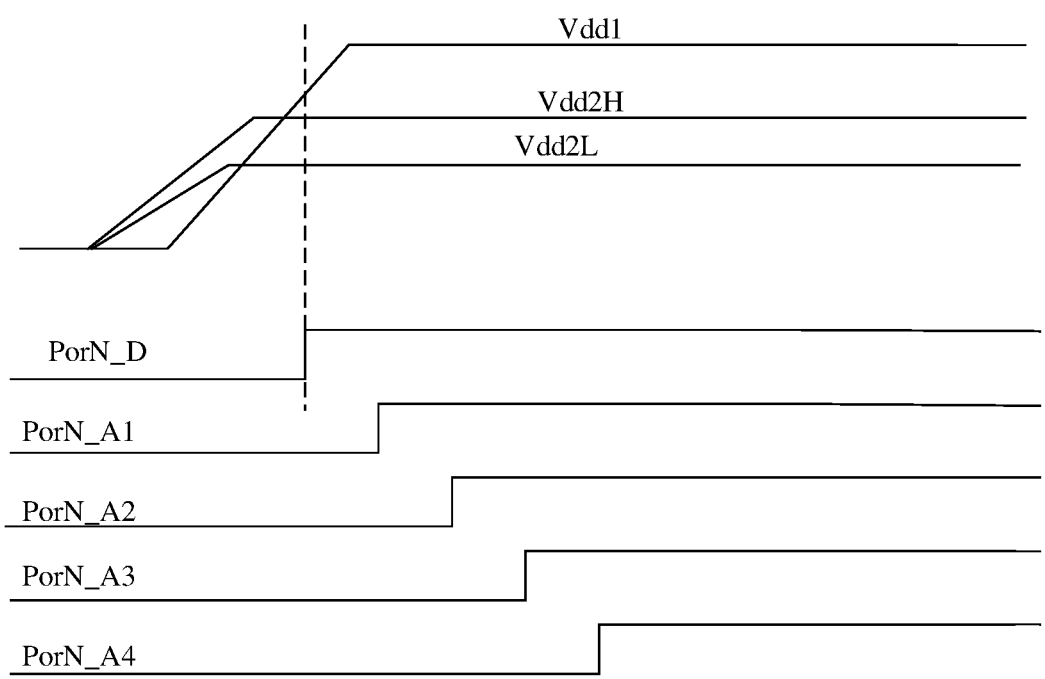
Figure 9:
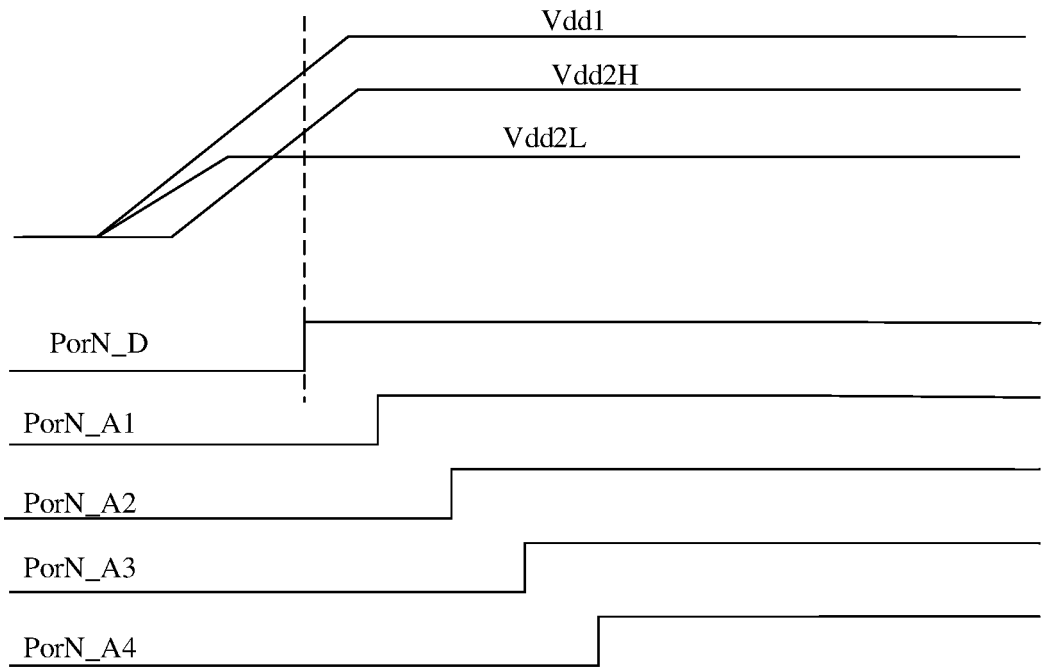

FIG. 7 to FIG. 9 are three different schematic diagrams all illustrating voltage waveforms of a first voltage domain, a second voltage domain, a third voltage domain and a monitoring signal. In the examples described below, Vdd1>Vdd2H>Vdd2L is normal power-on and the monitoring signal PorN_D in a valid state is high level signal.

As illustrated in FIG. 7 to FIG. 9, when ddl>Vdd2H>Vdd2L, that is, during normal power-on, the monitoring signal PorN_D is a high level signal. During the abnormal power-on period, the monitoring signal PorN_D is a low level signal. No matter how the voltages supplied by the first voltage domain Vdd1, the second voltage domain Vdd2H, and the third voltage domain Vdd2L change, the monitoring signal PorN_D outputted is always in a valid state in response to Vdd1>Vdd2H>Vdd2L.

It can be seen that the monitoring circuit provided by the embodiment of the disclosure can determine whether the voltages respectively provided by the first voltage domain Vdd1, the second voltage domain Vdd2H and the third voltage domain Vdd2L meet the requirements by determining whether the monitoring signal PorN_D is in an valid state.

Figure 10:
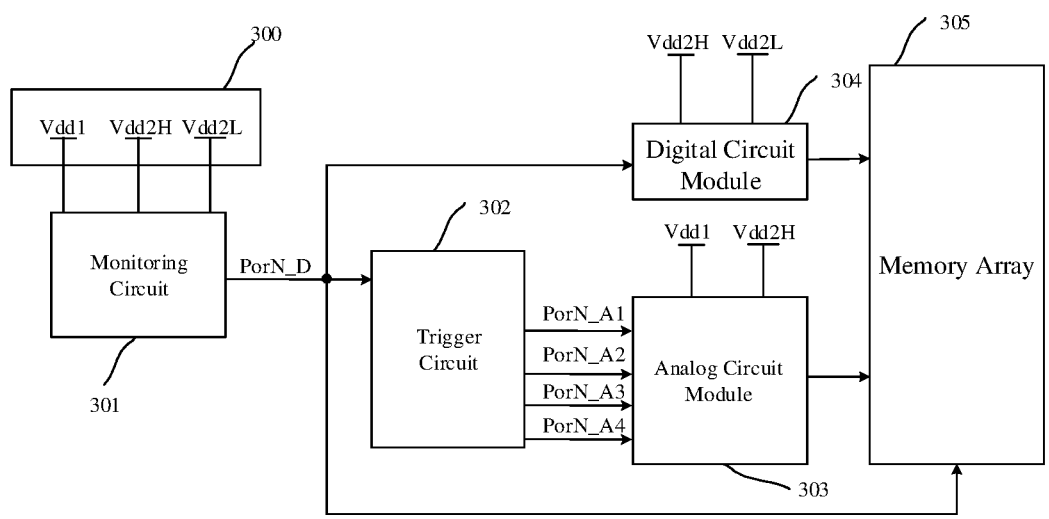
FIG. 10 is a functional block diagram illustrating a storage system according to an embodiment of the disclosure.
Figure 11:
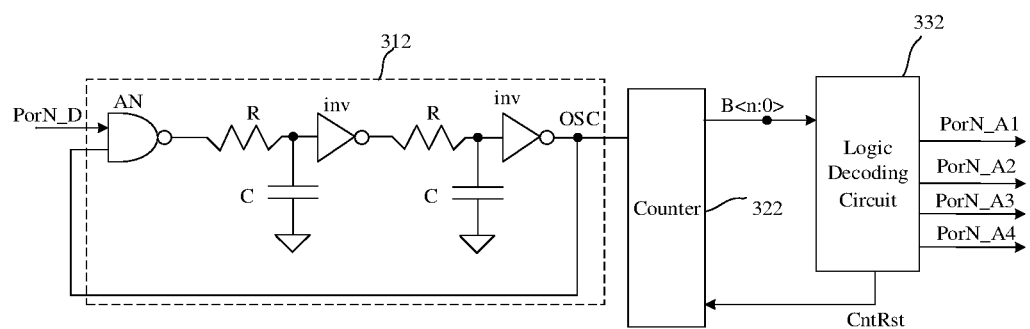
FIG. 11 is a schematic diagram illustrating a circuit structure of a trigger circuit in a storage system according to the embodiment of the disclosure.

Another embodiment of the disclosure also provides a storage system including the monitoring circuit provided by the above embodiments. FIG. 10 is a functional block diagram illustrating a storage system according to an embodiment of the disclosure. FIG. 11 is a schematic diagram illustrating a circuit structure of a trigger circuit in a storage system according to the embodiment of the disclosure. The storage system provided by the embodiment of the disclosure will be described in detail below in conjunction with the drawings. It should be noted that a same part or a corresponding part with the above-mentioned embodiments can be referred to the detailed description of the above-mentioned embodiments and will not be repeated below.

As illustrated in FIG. 10, a storage system provided by an embodiment of the disclosure includes a power supply network 300 and the monitoring circuit 301. The power supply network 300 has a first voltage domain Vdd1, a second voltage domain Vdd2H and a third voltage domain Vdd2L. The monitoring circuit 301 is provided by the above embodiments.

The storage system may be a DRAM storage system, such as a fifth-generation Double Data Rate (DDR5) DRAM storage system or a fourth-generation DDR (DDR4) DRAM storage system. In other embodiments, the storage system may also be a Static Random Access Memory (SRAM) storage system, a Synchronous Dynamic Random Access Memory (SDRAM) storage system, a Read-Only Memory (ROM) storage system, or a flash memory storage system.

The storage system may further include a trigger circuit 302, which is configured to generate at least one trigger signal in response to a monitoring signal PorN_D in a valid state. The trigger circuit 302 and the monitoring circuit 301 can be integrated into a Power on Reset (POR) module, which can outputs a monitoring signal PorN_D and a trigger signal.

The trigger circuit 302 may generate multiple trigger signals having different time intervals from a level change edge of the monitoring signal PorN_D. If the valid state of the monitoring signal PorN_D is high level, the level change edge is a level rising edge. If the valid state of the monitoring signal PorN_D is low level, the level change edge is a level falling edge.

As illustrated in FIG. 11, the trigger circuit 302 may include an oscillator 312, a counter 322 and a logic decoding circuit 332. The oscillator 312 is configured to oscillate in response to a monitoring signal PorN_D having a valid state to output an oscillation signal OSC. The counter 322 is configured to count the number of times of the oscillation signal OSC to obtain a count value and output the count value B<n:0>. The logic decoding circuit 332 is configured to generate a trigger signal based on the count value B<n:0>.

The oscillator 312 may be an RC delay based Ring Oscillator, which includes a nand gate AN, cascaded at least two resistors R and at least two inverters inv, and at least two capacitors C. One input end of the nand gate AN is used for receiving a power-on signal. The resistor R in the first stage is connected to the output end of the nand gate AN, the resistor in the last stage is connected to the other input end of the nand gate AN via a inverter inv, and two resistors R in the adjacent stages are connected via an inverter inv. One end of the capacitor C is connected to a connection node of the resistor R and the input end of the inverter inv, and the other end of the capacitor C is grounded. It should be noted that two resistors R, two inverters inv and two capacitors C are schematically illustrated in FIG. 11. In fact, the oscillator 312 may include N resistors R, N inverters inv and N capacitors C, where N may be any even number greater than or equal to 2, such as 4, 6, 8 and the like.

In other examples, the oscillator 312 may also be an LC oscillator, a quartz crystal Oscillator or the like.

The counter 322 obtains a period number of the oscillation periods of the oscillator 312 by counting the number of oscillations. It can be understood that the count value B<n:0> represents the period number of the oscillation periods. The count value B<n:0> is an enable signal, which enables the logic decoding circuit 332 to generate a trigger signal. When the count value B<n:0> reaches a preset value, the logic decoding circuit 332 generates a trigger signal, which may be a high level signal.

It can be understood that the count value B<n:0> represents the period number of the oscillation periods, and the duration of a single oscillation period of the oscillator 312 can be obtained, the corresponding count value B<n:0> also represents the oscillation duration, and the preset value correspondingly represents the preset duration. When the count value B<n:0> reaches the preset value, it indicates that the oscillation duration meets the preset duration, and the logic decoding circuit 332 generates a trigger signal.

The counter 322 may be a counting circuit based on a trigger. In a specific example, the counter 322 may be an 8-bit counter, where n is 7 in a corresponding count value B<n:0>. It can be understood that the bit number of the counter 322 can be determined according to an actual need, the counter 322 has a maximum count value, and the maximum count value represents a maximum oscillation duration, the maximum oscillation duration represented by the maximum count value of the counter 322 is less than or equal to a preset duration represented by a preset value. For example, the counter 322 may be a 4-bit counter, a 16-bit counter, a 32-bit counter or the like.

The logic decoding circuit 332 may also be configured to generate multiple trigger signals having different delays compared with the level change edge of the monitoring signal PorN_D. The logic decoding circuit 332 generates a first reset signal CntRst after generating the trigger signal. The counter 322 returns the count value B<n:0> to zero in response to the first reset signal CntRst, restarts counting after the count value B<n:0> returning to zero, and generates a next trigger signal and a first reset signal CntRst in response to the count value B<n:0> reaching the preset value. Repeated like this, until a preset number of trigger signals are generated. In addition, the logic decoding circuit 332 may also generate a second reset signal after all of the trigger signals are generated, and the oscillator 312 stops oscillating in response to the second reset signal.

It can be understood that the delays between the trigger signals sequentially generated in time may be the same or different, that is, the preset values corresponding to the different trigger signals may be the same or different.

Figure 12:
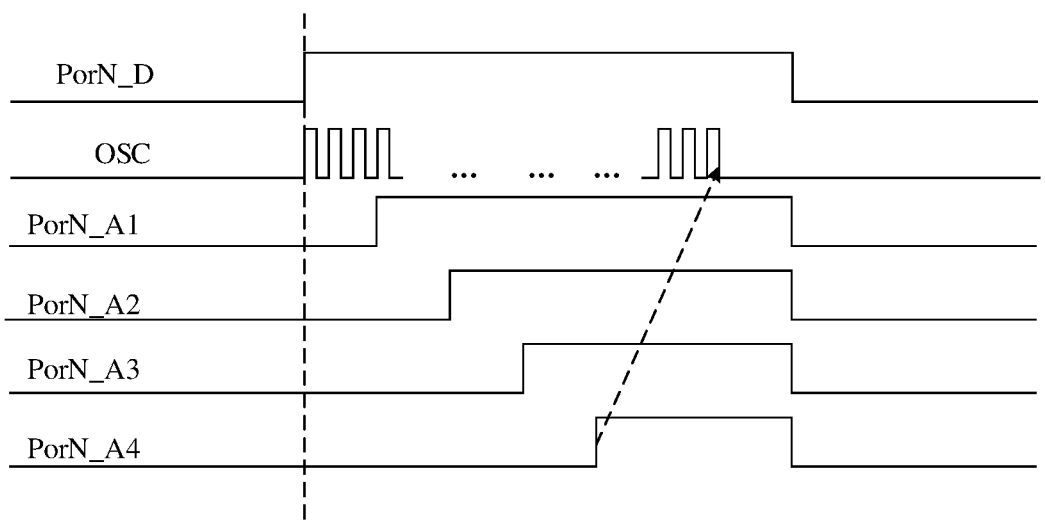
FIG. 12 is schematic diagram illustrating an oscillation signal timing, a monitoring signal timing and a trigger signal timing in a storage system according to an embodiment of the disclosure.

FIG. 12 is schematic diagram illustrating an oscillation signal timing, a monitoring signal timing and a trigger signal timing in a storage system according to an embodiment of the disclosure. As illustrated in FIG. 12, in some embodiments, a logic decoding circuit 332 generates four trigger signals as an example, which are a first trigger signal PorN_A1, a second trigger signal PorN_A2, a third trigger signal PorN_A3, and a fourth trigger signal PorN_A4. There are time delays between the monitoring signal PorN_D, the first trigger signal PorN_A1, the second trigger signal PorN_A2, the third trigger signal PorN_A3, and the fourth trigger signal PorN_A4.

In some embodiments, the logic decoding circuit 332 may further be configured to generate a second reset signal after generating all of the trigger signals, and the oscillator 312 stops oscillating in response to the second reset signal. As illustrated in FIG. 11 and FIG. 12, the oscillator 312 stops oscillating after the fourth trigger signal PorN_A4 is generated. The logic decoder circuit 332 may further be configured to latch all trigger signals after all trigger signals are generated.

The trigger circuit 302 may further be configured to reset a trigger signal to a low level in response to the monitoring signal PorN_D changing from a valid state to an invalid state.

FIG. 7 to FIG. 9 further illustrates timing diagrams for each trigger signal. As illustrated in FIG. 7 to FIG. 9, a valid monitoring signal PorN_D and multiple trigger signals with different delays are generated in a normal power-on state, that is, a first trigger signal PorN_A1, a second trigger signal PorN_A2, a third trigger signal PorN_A3 and a fourth trigger signal PorN_A4 are generated.

The storage system may further include an analog circuit module 303, a digital circuit module 304 and a memory array 305. The memory array 305 is configured to perform a read/write operation. The analog circuit module 303 is configured to generate a first control signal in response to a trigger signal. The digital circuit module 304 is configured to generate a second control signal in response to a monitoring signal PorN_D. The first control signal and the second control signal are transmitted to the memory array 305. In addition, the monitoring signal PorN_D may also be transmitted to the memory array 305.

The analog circuit module 303 may receive the first trigger signal PorN_A1, the second trigger signal PorN_A2, the third trigger signal PorN_A3, and the fourth trigger signal PorN_A4 as enable signals for enabling different circuit modules in the analog circuit module 303, respectively. The analog circuit module 303 may be operate at the first voltage domain Vdd1 and the second voltage domain Vdd2H, and the digital circuit module 304 may operate at the second voltage domain Vdd2H and the third voltage domain Vdd2L.

The storage system provided by the embodiment of the disclosure can monitor whether the voltages respectively provided by the first voltage domain Vdd1, the second voltage domain Vdd2H and the third voltage domain Vdd2L meet a requirement, and performs a read/write operation under a normal power-on condition.

The technical solution of the embodiments of the disclosure has at least the following advantages.

In the technical solution of the monitoring circuit in the embodiments of the disclosure, a first detection signal is used to indicate whether a first voltage from a first voltage domain meets a requirement, and if the first voltage is greater than or equal to a first preset value, the first detection signal meets the requirement. A second detection signal is used to indicate whether a second voltage from a second voltage domain meets a requirement. If the second voltage is greater than or equal to a second preset value, the second detection signal meets the requirement. A third detection signal is used to indicate whether a third voltage from the third voltage domain meets a requirement. If the third voltage is greater than or equal to the third preset value, the third detection signal meets the requirement. Under the condition that the first detection signal, the second detection signal and the third detection signal all meet the requirements, a monitoring signal in a valid state is generated. Whether the first voltage, the second voltage and the third voltage respectively provided by the first voltage domain, the second voltage domain and the third voltage domain meet the requirements can be determined by determining whether the monitoring signal is in a valid state.

Further, it should be noted that the modules or units for executing operations of the monitoring circuit according to the embodiment of the present disclosure, for example, the voltage detection module, the logic circuit module, the first output element and the like can be implemented by hardware such as circuits and processors.

A person of ordinary skill in the art may understand that the foregoing embodiments are specific implementations of the present invention. In actual applications, various changes may be made to the implementations in terms of forms and details without departing from the spirit and scope of the present invention. Any person skilled in the art may make changes and modifications without departing from the spirit and scope of the present invention. Therefore, the protection scope of the present invention shall be subject to the scope of the claims.

What is claimed is:

1. A monitoring circuit, comprising:
a voltage detection module, configured to: output a first detection signal, a second detection signal and a third detection signal through a first node, a second node and a third node, respectively, wherein the voltage detection module is specifically configured to: detect whether a first voltage from a first voltage domain is greater than or equal to a first preset value, and output the first detection signal having a first preset level in response to the first voltage being greater than or equal to the first preset value; detect whether a second voltage from a second voltage domain is greater than or equal to a second preset value, and output the second detection signal having a second preset level in response to the second voltage being greater than or equal to the second preset value; and detect whether a third voltage from a third voltage domain is greater than or equal to a third preset value, and output the third detection signal having a third preset level in response to the third voltage being greater than or equal to the third preset value; and
a logic circuit module, connected to the first node, the second node and the third node, and configured to output a monitoring signal through a fourth node, wherein the logic circuit module is specifically configured to: determine whether the first detection signal has the first preset level, whether the second detection signal has the second preset level, and whether the third detection signal has the third preset level, respectively; determine the monitoring signal to be in a valid state in response to the first detection signal having the first preset level, the second detection signal having the second preset level and the third detection signal having the third preset level; and determine the monitoring signal to be in an invalid state in response to at least one of the first detection signal, the second detection signal or the third detection signal not having a respective preset level of the first preset level, the second preset level and the third preset level;
wherein the voltage detection module comprises: a first output element, configured to directly output the first detection signal to the logic circuit module; a second output element, configured to directly output the second detection signal to the logic circuit module; and a third output element, configured to directly output the third detection signal to the logic circuit module, wherein all of the first output element, the second output element and the third output element operate in the second voltage domain,
the logic circuit module comprises a logic operation element directly connected to the first node, the second node and the third node, wherein the logic operation element operates in the second voltage domain, and
the first preset value is greater than the second preset value which is greater than the third preset value.

2. The monitoring circuit of claim 1, wherein the voltage detection module comprises:
a first detection unit, having an output end as the first node and configured to detect whether the first voltage is greater than or equal to the first preset value;
a second detection unit, having an output end as the second node and configured to detect whether the second voltage is greater than or equal to the second preset value; and
a third detection unit, having an output end as the third node and configured to detect whether the third voltage is greater than or equal to the third preset value.

3. The monitoring circuit of claim 2, wherein the first detection unit comprises:
a first detection circuit, configured to detect whether the first voltage is greater than or equal to the first preset value, and output the first detection signal having the first preset level through an output end of the first detection circuit in response to the first voltage being greater than or equal to the first preset value;
a first inverter, operating in the first voltage domain, and having an input end connected to the output end of the first detection circuit; and
a second inverter, operating in the second voltage domain, and having an input end connected to an output end of the first inverter and an output end as the first node.

4. The monitoring circuit of claim 3, wherein the first detection circuit comprises:
a first resistor and a second resistor connected in series, wherein one end of the first resistor receives the first voltage, a second end of the first resistor and one end of the second resistor are connected to a first voltage dividing node, and a second end of the second resistor is grounded;
a third resistor, having one end for receiving the first voltage; and
a first Negative channel Metal Oxide Semiconductor (NMOS) transistor, having a gate connected to the first voltage dividing node, a drain connected to a second end of the third resistor and used as the output of the first detection circuit, and a source grounded.

5. The monitoring circuit of claim 4, wherein the first detection circuit further comprises a first capacitor, one end of the first capacitor is connected to the first voltage dividing node, and a second end of the first capacitor is grounded.

6. The monitoring circuit of claim 2, wherein the second detection unit comprises:
a second detection circuit, configured to detect whether the second voltage is greater than or equal to the second preset value, and output the second detection signal having the second preset level through an output end of the second detection circuit in response to the second voltage being greater than or equal to the second preset value;

a third inverter, operating in the second voltage domain, and having an input end connected to the output end of the second detection circuit; and a fourth inverter, operating in the second voltage domain, and having an input end connected to an output end of the third inverter and an output end as the second node.

7. The monitoring circuit of claim 2, wherein the third detection unit comprises:

a third detection circuit, configured to detect whether the third voltage is greater than or equal to the third preset value, and output the third detection signal having the third preset level through an output end of third detection circuit in response to the third voltage being greater than or equal to the third preset value;

a fifth inverter, operating in the third voltage domain, and having an input end connected to the output end of the third detection circuit; and a third output element, operating in the second voltage domain, and having an input end connected to an output end of the fifth inverter and an output end as the third node.

8. The monitoring circuit of claim 7, wherein the third output element comprises:

a first level conversion unit, operating in the second voltage domain, connected to the output end of the fifth inverter, and configured to output the third detection signal; and an even number of cascaded sixth inverters, operating in the second voltage domain, and having an input end in a first stage for receiving the third detection signal and an output end in a last stage as the third node.

9. The monitoring circuit of claim 8, wherein the first level conversion unit comprises:

a fourth resistor; and a second Negative channel Metal Oxide Semiconductor (NMOS) transistor, wherein one end of the fourth resistor is used for receiving the second voltage, a second end of the fourth resistor is connected to a drain of the second NMOS transistor and used as an output node for outputting the third detection signal, an source of the second NMOS transistor is grounded and a gate of the second NMOS transistor is connected to the output end of the fifth inverter.

10. The monitoring circuit of claim 1, wherein the logic circuit module comprises:

a nor circuit, connected to the first node, the second node and the third node, and operating in the second voltage domain, and configured to output the monitoring signal through a fifth node, wherein the first preset level, the second preset level and the third preset level are a same level; and a drive circuit, providing a transmission path for transmitting the monitoring signal from the fifth node to the fourth node.

11. The monitoring circuit of claim 10, wherein the drive circuit comprises:

a first drive circuit, operating in the first voltage domain, and providing a first transmission path for transmitting the monitoring signal from the fifth node to a sixth node, wherein the sixth node is located between the fourth node and the fifth node; and a second drive circuit, operating in the second voltage domain, and providing a second transmission path for transmitting the monitoring signal from the sixth node to the fourth node.

12. The monitoring circuit of claim 11, wherein the first drive circuit comprises:

a second level conversion unit, connected to the fifth node, operating in the first voltage domain, and configured to: receive the monitoring signal, and output an inversed monitoring signal, wherein a phase of the inversed monitoring signal is opposite to a phase of the monitoring signal; and an eighth inverter, operating in the first voltage domain, and having an input end for receiving the inversed monitoring signal and an output end as the sixth node.

13. The monitoring circuit of claim 11, wherein the second drive circuit comprises:

an even number of cascaded ninth inverters, operating in the second voltage domain, and having an input end in a first stage connected to the sixth node and an output end in a last stage as the fourth node.

14. A monitoring circuit, comprising:

a voltage detection module, configured to: output a first detection signal, a second detection signal and a third detection signal through a first node, a second node and a third node, respectively, wherein the voltage detection module is specifically configured to: detect whether a first voltage from a first voltage domain is greater than or equal to a first preset value, and output the first detection signal having a first preset level in response to the first voltage being greater than or equal to the first preset value; detect whether a second voltage from a second voltage domain is greater than or equal to a second preset value, and output the second detection signal having a second preset level in response to the second voltage being greater than or equal to the second preset value; and detect whether a third voltage from a third voltage domain is greater than or equal to a third preset value, and output the third detection signal having a third preset level in response to the third voltage being greater than or equal to the third preset value; and a logic circuit module, connected to the first node, the second node and the third node, and configured to output a monitoring signal through a fourth node, wherein the logic circuit module is specifically configured to: determine whether the first detection signal has the first preset level, whether the second detection signal has the second preset level, and whether the third detection signal has the third preset level, respectively; determine the monitoring signal to be in a valid state in response to the first detection signal having the first preset level, the second detection signal having the second preset level and the third detection signal having the third preset level; and determine the monitoring signal to be in an invalid state in response to at least one of the first detection signal, the second detection signal or the third detection signal not having a respective preset level of the first preset level, the second preset level and the third preset level;

wherein the voltage detection module comprises:

a first detection unit, having an output end as the first node and configured to detect whether the first voltage is greater than or equal to the first preset value;

a second detection unit, having an output end as the second node and configured to detect whether the second voltage is greater than or equal to the second preset value; and a third detection unit, having an output end as the third node and configured to detect whether the third voltage is greater than or equal to the third preset value;

wherein the first detection unit comprises:

a first detection circuit, configured to detect whether the first voltage is greater than or equal to the first preset value, and output the first detection signal having the first preset level through an output end of the first detection circuit in response to the first voltage being greater than or equal to the first preset value;

a first inverter, operating in the first voltage domain, and having an input end connected to the output end of the first detection circuit; and a second inverter, operating in the second voltage domain, and having an input end connected to an output end of the first inverter and an output end as the first node.

15. A monitoring circuit, comprising:

a voltage detection module, configured to: output a first detection signal, a second detection signal and a third detection signal through a first node, a second node and a third node, respectively, wherein the voltage detection module is specifically configured to: detect whether a first voltage from a first voltage domain is greater than or equal to a first preset value, and output the first detection signal having a first preset level in response to the first voltage being greater than or equal to the first preset value; detect whether a second voltage from a second voltage domain is greater than or equal to a second preset value, and output the second detection signal having a second preset level in response to the second voltage being greater than or equal to the second preset value; and detect whether a third voltage from a third voltage domain is greater than or equal to a third preset value, and output the third detection signal having a third preset level in response to the third voltage being greater than or equal to the third preset value; and a logic circuit module, connected to the first node, the second node and the third node, and configured to output a monitoring signal through a fourth node, wherein the logic circuit module is specifically configured to: determine whether the first detection signal has the first preset level, whether the second detection signal has the second preset level, and whether the third detection signal has the third preset level, respectively; determine the monitoring signal to be in a valid state in response to the first detection signal having the first preset level, the second detection signal having the second preset level and the third detection signal having the third preset level; and determine the monitoring signal to be in an invalid state in response to at least one of the first detection signal, the second detection signal or the third detection signal not having a respective preset level of the first preset level, the second preset level and the third preset level;

wherein the voltage detection module comprises:

a first detection unit, having an output end as the first node and configured to detect whether the first voltage is greater than or equal to the first preset value;

a second detection unit, having an output end as the second node and configured to detect whether the second voltage is greater than or equal to the second preset value; and a third detection unit, having an output end as the third node and configured to detect whether the third voltage is greater than or equal to the third preset value;

wherein the third detection unit comprises:

a third detection circuit, configured to detect whether the third voltage is greater than or equal to the third preset value, and output the third detection signal having the third preset level through an output end of third detection circuit in response to the third voltage being greater than or equal to the third preset value;

a fifth inverter, operating in the third voltage domain, and having an input end connected to the output end of the third detection circuit; and a third output element, operating in the second voltage domain, and having an input end connected to an output end of the fifth inverter and an output end as the third node.

* * * * *